Dec. 11, 1962     W. L. WAINWRIGHT     3,067,670
DAMPING DEVICE FOR LIGHT WEIGHT FLAP
Filed Oct. 29, 1959
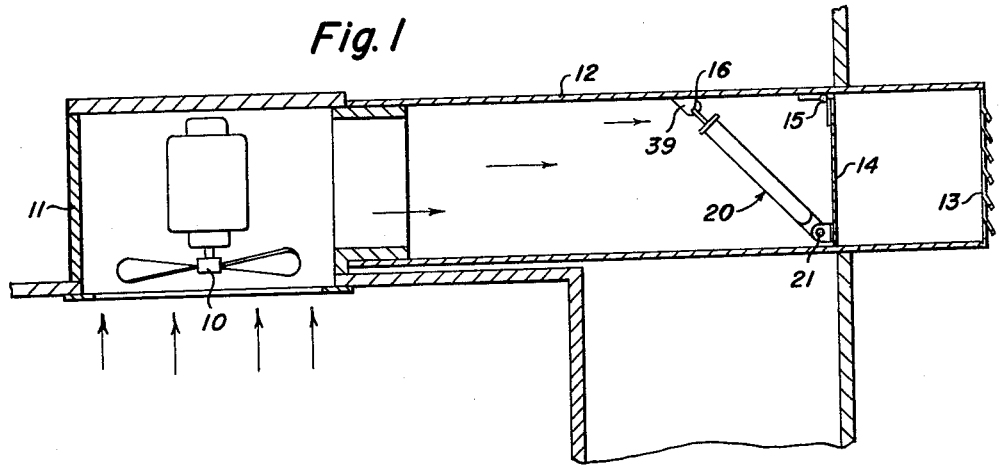
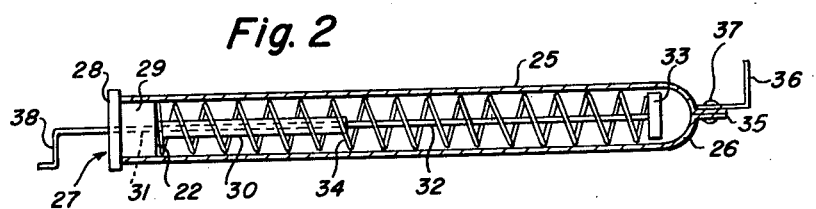
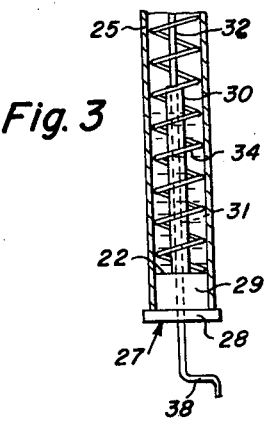
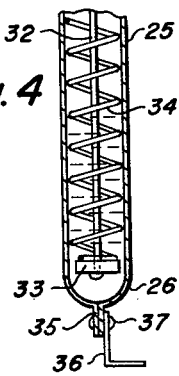
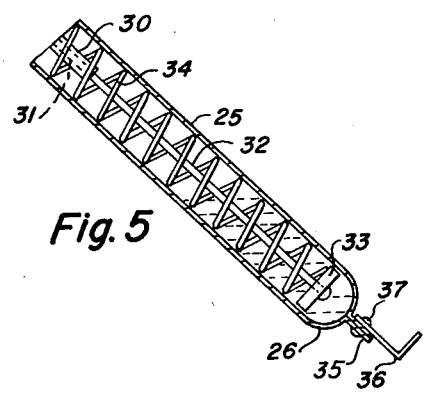
WILLIAM L. WAINWRIGHT
INVENTOR.
BY *[signature]*
AGENT United States Patent Office 3,067,670
Patented Dec. 11, 1962

3,067,670
DAMPING DEVICE FOR LIGHT WEIGHT FLAP
William L. Wainwright, Rochester, N.Y., assignor to Fasco Industries, Inc., Rochester, N.Y., a corporation of New York
Filed Oct. 29, 1959; Ser. No. 849,626
7 Claims. (Cl. 98—116)

The present invention relates to a damping device and more particularly to a damping device for use in conjunction with a light-weight flap mounted in an exhaust duct.

In the use of fans and ventilating units for changing the air in a room and which are usually connected to the outside atmosphere either directly or by means of a duct, a light-weight flap is usually utilized to close the passageway except when the fan or ventilating unit is in operation. When such a device is in use, the flap is raised to a position to open the duct to permit free movement of air to the outside atmosphere. Normally, such a flap is either spring or gravity biased into a duct-closing position and the main objection to such a mounting of the flap is that it is subject to movement with very small differences in pressure on opposite sides thereof. Due to these small differences in pressure, the flap will oscillate between its closed position and a partially open position, which produces a series of annoying vibrations.

In order to overcome the above-mentioned disadvantage, a small damper device has been devised to prevent annoying vibrations irrespective of any differences in pressure. Such a damping device, however, must be of relatively small dimensions for mounting and insertion within a duct which will vary between 4 and 6 inches in either rectangular dimensions or in diameter. Damping or checking devices are, of course, well known for use in conjunction with doors, but such devices are relatively large and concerned with damping the action of members which weigh anywhere from 1 to 100 lbs. depending on the size and material. Further, such heavy damping devices are of a structure and dimension such that they are not feasible in the field in which the present damping device is utilized nor are they capable of being reduced to a size compatible for use in a duct of the dimensions mentioned above.

The primary object of the invention is, therefore, to provide a damping device which is very small in size and which may be utilized primarily with a very light-weight member.

A further object of the invention is to provide a damping device using a viscous liquid as a damping means and which is so constructed that the damping fluid is retained in the device irrespective of the position of the device in use or in transit. This object is accomplished in spite of the difficulties imposed by the small size and light weight construction of the device.

And still another object of the invention is to provide a damping device which is relatively simple in construction and which utilizes a minimum number of operating parts.

Other objects and advantages of the invention will be apparent to those skilled in the art by the description of a preferred embodiment of the invention which follows:

Reference is now made to the accompanying drawing wherein like reference numerals designate like parts and wherein:

FIG. 1 is a side elevation showing diagrammatically the damping device utilized in conjunction with an exhaust fan system;

FIG. 2 is a horizontal section through a preferred embodiment of the invention;

FIG. 3 is a vertical section through the sealed end of the damping device;

FIG. 4 is a vertical section through the formed end of the damping device; and

FIG. 5 is a vertical section through one end of the damping device showing the liquid level when the device is mounted for use.

In an exhaust system such as shown in FIG. 1, a motor-driven fan 10 is usually mounted in a casing or housing 11 which is mounted in the ceiling or wall of a room and connected to the outside atmosphere by a duct 12 having an end which is usually provided at the outer extremity with louvres 13. Duct 12 is usually provided with a flap 14 having an outline to conform to the cross section of the duct and said flap is usually pivotally mounted at 15 within the duct for normally closing the duct either by gravity or by means of a torsion or extension spring (not shown).

In such an arrangement, when the motor-driven fan 10 is started, air is drawn from the room and moved through duct 12 to the outside atmosphere. The initial pressure built up by the air moving through the duct causes flap 14 to move to an open position which is against the force of gravity or the spring normally biasing the flap to a closed position. As soon as the motor-driven fan 10 is shut off, flap 14 immediately assumes its duct-closing position. In this position the flap usually comes to rest against a stop and with small differences in pressure on the opposite sides of flap 14, it will oscillate and vibrate against the stop.

The present invention comprises mounting a damping device, designated broadly by the numeral 20, which is pivotally connected to the free end of flap 14 at 21. With this arrangement, a considerable difference in pressure is required to move flap 14 to even a partially open position. When this pressure difference becomes equalized, the movement of flap 14 to its closing position is damped by the device 20 and no annoying vibration of the flap can take place. The damping device 20 comprises a cylindrical member 25 which is formed at the end 26 to provide a closed and sealed end. The other end of member 25 is open and is sealed by member 27. It will be noted with respect to FIG. 2, that member 27 comprises three coextensive cylindrical parts of decreasing diameters, a flange 28, a sealing portion 29 and an extending sleeve 30, the member 27 being provided with an axial aperture 31 which extends through all three portions thereof. When member 27 is inserted within cylindrical member 25, portion 29 seals the open end of member 25 with flange 28 abutting the end of member 25. In order to maintain the weight of the device at a minimum, it has been found that member 27, when made with a material such as nylon, provides not only a good seal for the open end of member 25, but also an excellent bearing material for piston rod 32 which extends through the aperture 31 therein.

For the same reason as stated above, with respect to member 27, piston 33, which is fixed to the inner end of rod 32, can also be made of a plastic material, such as nylon. A coil spring 34 (which may or may not be necessary) is mounted within member 25 and between piston 33 and the shoulder 22 of portion 29, as shown in FIG. 2. This spring maintains piston 33 in its fully extended position adjacent the formed end 26 of member 25. The end 26 is formed with an ear 35 to which a bracket 36 is pivotally mounted at 37. The interior of member 25 can be partially filled with a highly viscous liquid, such as silicone, which serves to damp the movement of piston 33.

When device 20 is mounted within duct 12, the outer end 38 of piston rod 32 is pivotally hooked to a suitable bracket 39 which is secured within and to duct 12. The bracket 36 which is pivotally mounted to the closed end 26 of member 25 is pivotally fastened to the free end of flap 14 and member 20 assumes a position as shown in FIG. 1. It can be readily appreciated that any small differences in pressure on either side of flap 14 may cause the flap to partially open, but any oscillations or vibrations of the flap will be damped by the action of piston 33 and the fluid within member 25.

While portion 29 of member 27 seals the open end of member 25, the sleeve portion 30 is of sufficient length to permit the entire device to be inverted with the end of sleeve 30 above the level which the fluid will assume in this inverted position, see FIG. 3. Since the metal piston rod 32 is relatively small in diameter, that is, of the order of .030 to .050 inch in diameter, and the axial aperture 31 in member 27 is of a size permitting rod 32 to move freely therein, any leakage of the damping fluid due to capillary action along piston rod 32 is, for all practical purposes, prevented because member 27 is made of a non-wettable plastic material. As a result, the device 20 can be supported or arranged in an upright or inverted position for handling and shipping purposes without any danger of the fluid leaking from within the member 25 through aperture 31.

It can be readily appreciated that it would be impractical, if not impossible, to manufacture known types of damping devices which would be of a size to be utilized for the purposes described hereinabove. Most known damping devices are considerably more complicated and comprise many more parts, most of which would not be feasible to manufacture when reduced to a size to be compatible for the same application as the device disclosed herein. It has been found that for most applications of the type described herein, that cylindrical member 25 can be of a length less than 3" and can be of a diameter of the order of ⅜ of an inch to provide ample damping action for a flap of 16 to 18 square inches. Member 25 can be a thin-wall brass tube, or a tube of any other rigid material, of the dimensions mentioned above or a tube of any suitable oil-resistant plastic material, and member 27 and piston 33 can be of any non-wettable plastic material which is also oil resistant.

It is to be understood by those skilled in the art that various other types of materials and plastic materials other than those mentioned above may be utilized to provide a damping device of the type disclosed. The preferred embodiment of the invention as just described is therefore not to be considered as a limitation of the invention, but the invention is of the scope defined by the appended claims.

Having now described my invention, what I desire to secure by Letters Patent of the United States and what I claim is:

1. A damping device comprising a thin-walled, cylindrical member having a closed end and an open end, said cylindrical member being less than half-filled with a liquid, a sealing member of a material not wettable by said liquid inserted in and sealing said open end, said sealing member having an elongated central portion extending axially into said cylindrical member to a point which is above the liquid whichever end of said cylindrical member is pointed upward, said central portion having an axial hole adapted to be a shaft bearing, a piston loosely fitted in said cylindrical member and adapted to be moved between said closed end and said central portion, a piston rod journaled in said axial hole and having one end secured to said piston and the other end extending beyond said sealing member, and a coil spring arranged in said cylindrical member between said piston and said sealing member for urging said piston toward said closed end, said liquid serving to damp movement of said piston when said closed end is downward.

2. A damping device in accordance with claim 1 wherein said sealing member is made of nylon.

3. A damping device comprising a thin-walled, cylindrical member having a closed end and an open end, said cylindrical member being partially filled with a high viscosity liquid, a bearing and sealing member provided with an axial hole and adapted to be inserted into the open end of said cylindrical member, said bearing and sealing member including a flange portion for engaging the end of said cylindrical member at said open end to position said bearing and sealing member in relation to said cylindrical member, a sealing portion for engaging the inner surface of said cylindrical member at said open end to retain said liquid, and an axial portion extending to a point within said cylindrical member at which the end of said axial portion will be above the level of said liquid when said cylindrical member is in its normal position and also when it is inverted, said portions being cylinders of decreasing diameters and axially coextensive with each other, a piston arranged within said cylindrical member and adapted to be moved between said closed end and the end of said axial portion, a piston rod journaled in said axial hole and having one end secured to said piston and the other end extending beyond said bearing and sealing member, and a coil spring arranged in said cylindrical member between said piston and the shoulder formed by the junction of said sealing portion and said axial portion for biasing said piston toward said closed end, said liquid serving to damp movement of said piston.

4. A damping device in accordance with claim 3 wherein said cylindrical member is a thin-wall tube having an inside diameter of substantially three-eighths of an inch.

5. A damping device in accordance with claim 3 wherein said bearing and sealing member is composed of a resinous polyamide material.

6. A damping device in accordance with claim 3 wherein said bearing and sealing member is made of nylon.

7. An exit duct for an exhaust fan comprising an approximately horizontal duct, a light weight flap hinged at the top thereof to said duct and substantially covering the opening in said duct when in a closed position, a damping device secured to said duct and to said flap and cooperating with gravity to urge said flap into said closed position, the weight of said flap being so small and the urging of said damping device so weak that said flap is moved to an open position by the exhaust air pressure when said exhaust fan is operating, said damping device comprising a thin-walled cylindrical member having a closed end secured to said flap and an open end, said cylindrical member being less than half-filled with a liquid, a sealing member of a material not wettable by said liquid inserted in and sealing said open end, said sealing member having an elongated central portion extending axially into said cylindrical member to a point which is above the liquid, said central portion having an axial hole adapted to serve as a bearing, a piston loosely fitted in said cylindrical member and adapted to be moved between said closed end and said central portion, a piston rod journaled in said axial hole and having one end secured to said piston and the other end fixed to said duct, and a coil spring arranged in said cylindrical member between said piston and said sealing member for urging said piston toward said closed end and said flap into said closed position, said liquid serving to damp movement of said piston and said flap.

References Cited in the file of this patent

UNITED STATES PATENTS

| | | |
|---|---|---|
| 1,052,019 | Spring | Feb. 4, 1913 |
| 2,665,447 | Lovejoy | Jan. 12, 1954 |
| 2,804,008 | Koch | Aug. 27, 1957 |
| 2,905,458 | Mason | Sept. 22, 1959 |
| 2,965,418 | Edler | Dec. 20, 1960 |

FOREIGN PATENTS

| | | |
|---|---|---|
| 1,060,120 | Germany | June 25, 1959 |